(12) United States Patent
Bender et al.

(10) Patent No.: US 7,308,100 B2
(45) Date of Patent: Dec. 11, 2007

(54) METHOD AND APPARATUS FOR TIME-BASED CHARGING FOR BROADCAST-MULTICAST SERVICES (BCMCS) IN A WIRELESS COMMUNICATION SYSTEM

(75) Inventors: Paul E. Bender, San Diego, CA (US); Roy Franklin Quick, Jr., San Diego, CA (US); Parag Arun Agashe, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 32 days.

(21) Appl. No.: 10/921,425

(22) Filed: Aug. 17, 2004

(65) Prior Publication Data

US 2005/0117743 A1 Jun. 2, 2005

Related U.S. Application Data

(60) Provisional application No. 60/496,153, filed on Aug. 18, 2003.

(51) Int. Cl.
*H04N 7/16* (2006.01)
*H04L 9/16* (2006.01)
(52) U.S. Cl. .......................................... 380/231; 705/52
(58) Field of Classification Search ................. 726/34, 726/35, 27; 380/230, 231, 233
See application file for complete search history.

(56) References Cited

U.S. PATENT DOCUMENTS

| 4,163,255 | A  | * | 7/1979  | Pires ............................ 380/233 |
| 4,323,921 | A  | * | 4/1982  | Guillou ......................... 705/53 |
| 5,758,068 | A  | * | 5/1998  | Brandt et al. .................. 726/27 |
| 6,240,091 | B1 | * | 5/2001  | Ginzboorg et al. .......... 370/401 |
| 6,343,280 | B2 | * | 1/2002  | Clark ............................ 705/55 |
| 2002/0164025 | A1 | * | 11/2002 | Raiz et al. .................... 380/231 |
| 2002/0169724 | A1 |   | 11/2002 | Moroney et al. .............. 705/52 |
| 2004/0266391 | A1 | * | 12/2004 | Hafren ......................... 455/405 |
| 2005/0055551 | A1 | * | 3/2005  | Becker et al. ............... 713/171 |
| 2005/0108563 | A1 | * | 5/2005  | Becker et al. ............... 713/200 |

\* cited by examiner

*Primary Examiner*—Matthew B Smithers
(74) *Attorney, Agent, or Firm*—George J. Oehling; Roberta A. Young; Thomas Rouse

(57) ABSTRACT

A method and apparatus for time-based charging for viewing content from a broadcast-multicast service (BCMCS) at a mobile station of a wireless communication system is disclosed. A count value (SKCount) is determined based upon the number of generated short-term keys (SK) that are used to decrypt particular content from the BCMCS. The amount of time the particular content is viewed at the mobile station may be determined as a function of the count value (SKCount) and the period (SKPeriod) between the generation of the short-term keys. This provides information about a user's actual content view time since the short-term key is needed to view the particular content broadcast to the mobile station.

19 Claims, 3 Drawing Sheets

METHOD AND APPARATUS FOR TIME-BASED CHARGING FOR BROADCAST-MULTICAST SERVICES (BCMCS) IN A WIRELESS COMMUNICATION SYSTEM

CLAIM OF PRIORITY UNDER 35 U.S.C. §119

The present Application for Patent claims priority to Provisional Application No. 60/496,153 entitled "Time-Based Charging for Broadcast-Multicast Services" filed Aug. 18, 2003, and assigned to the assignee hereof and hereby expressly incorporated by reference herein.

REFERENCE TO CO-PENDING APPLICATIONS FOR PATENT

The present Application for Patent is related to the following co-pending U.S. Patent Applications:

"Method and Apparatus for Security in a Data Processing System" by Philip Hawkes et al., U.S. application Ser. No. 09/933,972, filed Aug. 20, 2001, assigned to the assignee hereof, and expressly incorporated by reference herein;

"Method and System for Reduction of Decoding Complexity in a Communication System" by Tao Chen et al., U.S. application Ser. No. 09/976,591, filed Oct. 12, 2001, assigned to the assignee hereof, and expressly incorporated by reference herein;

"Method and Apparatus for Broadcast Services in a Communication System" by Parag Agashe et al., U.S. application Ser. No. 10/335,626, filed Jan. 2, 2003, assigned to the assignee hereof, and expressly incorporated by reference herein; and "Secure Registration for a Multicast-Broadcast-Multimedia System (MBMS)" by Francesco Grilli et al., U.S. application Ser. No. 10/617,215, filed Jul. 7, 2003, assigned to the assignee hereof, and expressly incorporated by reference herein.

BACKGROUND

1. Field

The present invention relates generally to communications, and more specifically, to a method and apparatus for charging for information services in a wireless communication system employing a broadcast-multicast communication service (BCMCS).

2. Background

Broadcast-multicast services (BCMCS) provide point-to-multipoint communication service in a wireless communication system to a plurality of mobile stations that receive the broadcast data through a wireless communication medium. The broadcast data (i.e., content) transmitted by the wireless communication system to the plurality of mobile stations may include, but need not necessarily be limited to, news, movies, sporting events, and the like. The specific type of content transmitted to the mobile stations may include a wide array of multi-media data, such as text, audio, picture, streaming video, etc. The content is typically generated by a content provider and is broadcast to the mobile stations that subscribe to the particular service over a broadcast channel of the wireless communication system.

The broadcast content is typically encrypted and decrypted through several levels of encryption and decryption to provide at least some level of assurance that unauthorized users will not be able to decrypt the content to which they are not entitled (i.e., content that is not subscribed to by the user of the mobile station). To enable the encryption and decryption of the broadcast content, the broadcast-multicast service employs the use of encryption keys.

A long-term encryption key, commonly referred to as a broadcast access key (BAK), is provisioned into the memory of the mobile station by the broadcast-multicast service. A short-term key (SK) is derived from the broadcast access key BAK and a random number SKRAND. The content is encrypted with the short-term key SK, and is broadcast over the air to the mobile station by the wireless communication system along with the random number SKRAND. The mobile station computes the short-term key SK from the random number SKRAND and the broadcast access key BAK, and decrypts the received content using the short-term key SK for presentation of the content to the mobile station's user.

Typically, the user of the mobile station is charged for the broadcast content upon receipt of the broadcast access key BAK. Therefore, regardless of whether or not the user is actually viewing the broadcast content from the broadcast-multicast service, the user is charged upon receipt of the broadcast access key (BAK). When the user is charged for broadcast content that he or she is not currently viewing, the user is burdened with these additional expenses incurred unnecessarily.

The present invention is directed to overcoming, or at least reducing the effects of, one or more problems set forth above.

SUMMARY

In one aspect of the invention, a method is provided. The method includes receiving a periodically changing number and receiving a first key with an identifier to indicate a service channel. At least one second key is generated as a function of at least the periodically changing number and the first key. The generated number of second keys are counted to produce a count value for accounting of content displayed at a terminal.

In another aspect of the invention, an apparatus is provided. The apparatus includes means for receiving a periodically changing number and means for receiving a first key with an identifier to indicate a service channel. The apparatus further includes means for generating at least one second key as a function of at least the periodically changing number and the first key, and means for counting the generated number of second keys to produce a count value for accounting of content displayed at a terminal.

DETAILED DESCRIPTION

Figure 1:
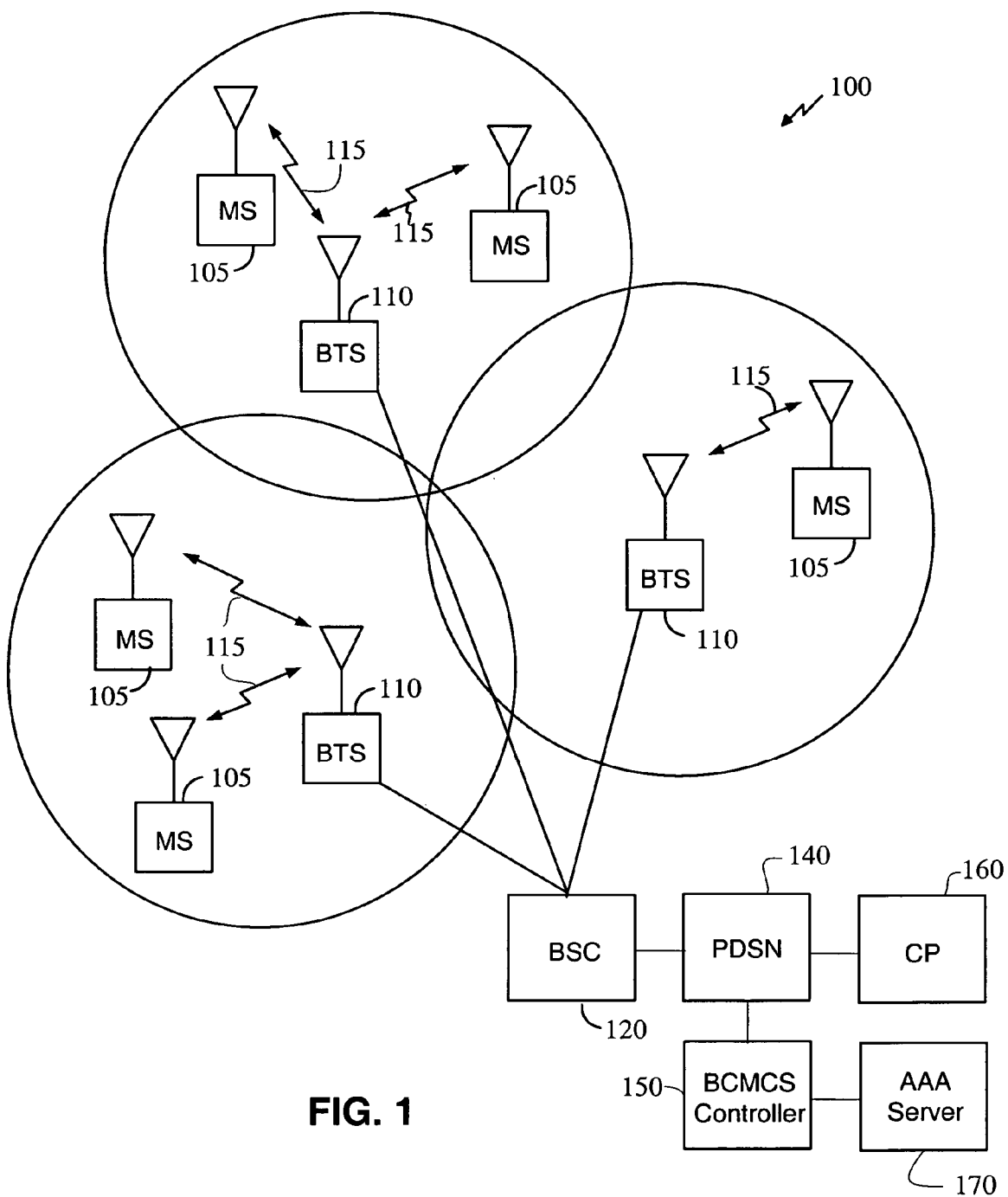
FIG. 1 is an exemplary block diagram illustrating a wireless communication system employing a broadcast-multicast service (BCMCS) according to one embodiment of the present invention.

Turning now to the drawings, and specifically referring to FIG. 1, an exemplary block diagram of a wireless communication system 100 is shown in accordance with one embodiment of the present invention. The wireless communication system 100 comprises a plurality of mobile stations (MS) 105 that communicate with a plurality of base transceiver sites (BTS) 110, which are geographically dispersed to provide continuous communication coverage with the mobile stations 105 as they traverse the wireless communication system 100. The mobile station 105 may take the form of any device that is capable of receiving information from the base transceiver site 110, including a personal digital assistant (PDA), wireless telephone, laptop computer with wireless capability, wireless modem, or any other wireless-capable device.

According to one embodiment, the wireless communication system 100 employs a Broadcast-Multicast Service (BCMCS) for point-to-multipoint transmission of data packets to a predetermined group of mobile stations 105 communicating within the wireless communication system 100. In one embodiment, the data packets provide content such as, for example, news, movies, sporting events, and the like that is transmitted from the base transceiver sites 110 over a wireless communication link 115 to the mobile stations 105. It will be appreciated that the specific type of content transmitted to the mobile stations 105 may include a wide array of multi-media data (e.g., text, audio, picture, streaming video, etc.), and, thus, need not necessarily be limited by the aforementioned examples.

Each base transceiver site 110 is coupled to a base station controller (BSC) 120, which controls connections between the base transceiver sites 110 and other components of the wireless communication system 100. The base transceiver sites 110 and the base station controller 120 collectively form a radio access network (RAN) for transporting the content to the plurality of mobile stations 105 that communicate within the wireless communication system 100. The radio access network may either be owned by the wireless carrier which provides subscription service to the user of the mobile station 105 or may be a visited network owned by another carrier which provides service to the user of the mobile station 105 while the mobile station 105 is roaming.

In one embodiment, the base station controller 120 is coupled to a packet data serving node (PDSN) 140 via a Packet Control Function (PCF) for interfacing the wireless communication system 100 to a content provider (CP) 160 via an Internet Protocol (IP) medium (not shown). The PDSN 140 processes the data packets for distribution to the mobile stations 105 under the control of a BCMCS controller 150, which may or may not have a direct connection to the PDSN 140. The BCMCS controller 150 schedules the broadcasting and multicasting of content provided by the content provider 160 and performs security functions for the broadcast-multicast service.

For BCMCS service, the base transceiver site 110 receives the stream of information from the PDSN 140 and provides the information on a designated wireless communication link 115 to the predetermined group of mobile stations 105 communicating within the wireless communication system 100. The BCMCS controller 150 may further be coupled to an Authentication, Authorization, and Accounting (AAA) server 170, which provides authentication, authorization, and accounting for the plurality of mobile stations 105 of the wireless communication system 100 that subscribe to the broadcast-multicast service. The AAA server 170 may be implemented as a third-party server that is owned by neither the home network carrier nor the serving network carrier of the mobile station 105.

The content provider 160 generates the content to be broadcast from the base transceiver sites 110 to the predetermined group of mobile stations 105 that are authorized to receive the specific type of content. The content provider 160 may be implemented as a third-party content source that is owned by neither the home network carrier nor the serving network carrier of the mobile station 105. It will be appreciated that the base station controller 120 may also be coupled to various other types of networks, such as a public switched telephone network (PSTN) (not shown), for example, to extend the communication capabilities of the wireless communication system 100. In the illustrated embodiment, the base transceiver sites 110 and the mobile stations 105 operate in accordance with a code division multiple access (CDMA) scheme. It will be appreciated, however, that the wireless communication system 100 may employ various other multiple access schemes, such as time division multiple access (TDMA) and the like, without departing from the spirit and scope of the present invention.

The wireless communication system 100 enables high speed BCMCS service through the wireless communication link 115 that includes a broadcast channel capable of high data rates that may be received by a large number of mobile stations 105. The term broadcast channel is used herein to mean a single forward link physical channel that carries broadcast traffic. Data may also be transmitted from the mobile stations 105 to the base transceiver sites 110 through a reverse link of the wireless communication link 115. In one embodiment, the reverse link may include a signaling traffic channel and a data rate control (DRC) channel. The data rate control (DRC) channel of the reverse link may be used via a data rate request to indicate to the wireless communication system 100 a supportable broadcast data rate that may be used to broadcast the content over the broadcast channel of the forward link.

Figure 2:
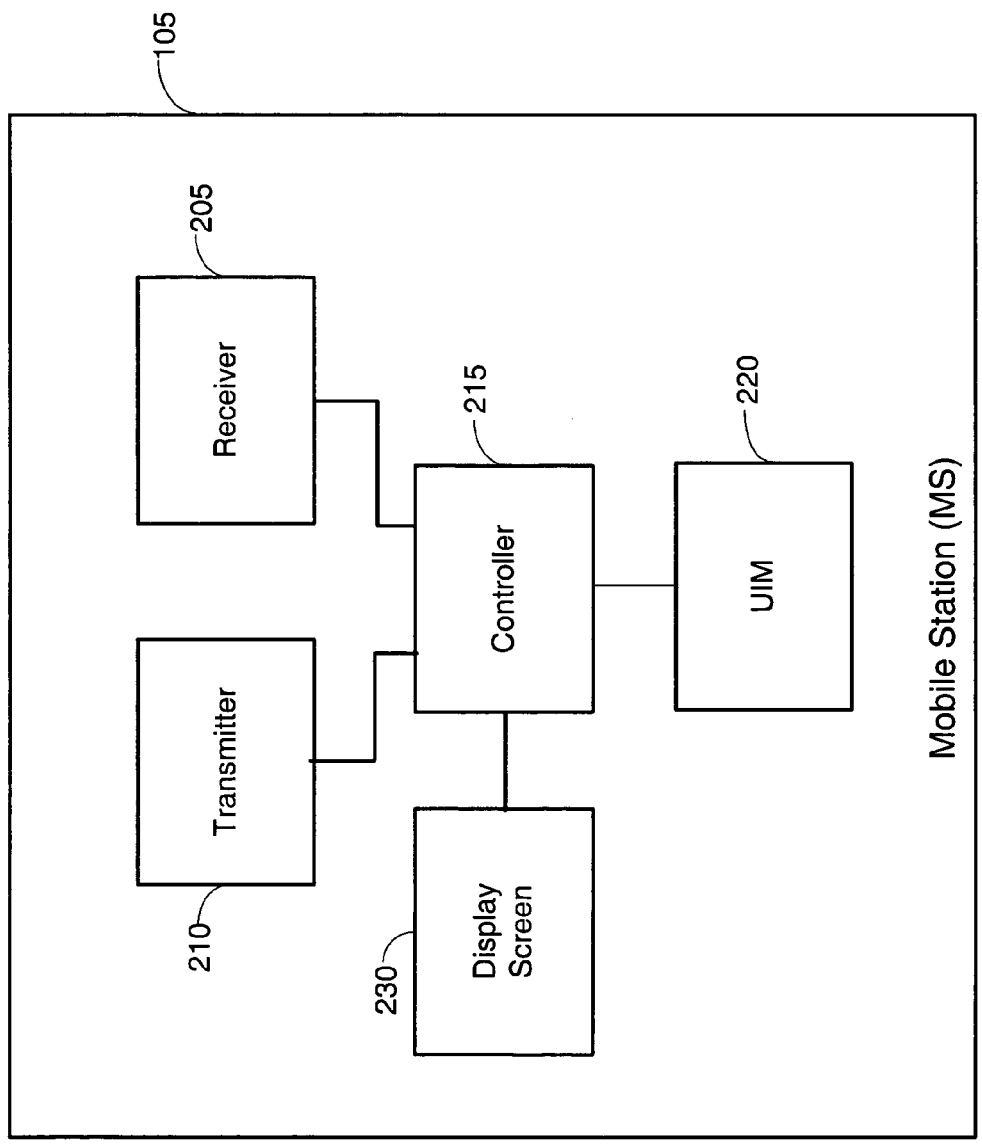
FIG. 2 is block diagram illustrating a more detailed representation of a mobile station of the wireless communication system of FIG. 1.

Referring now to FIG. 2, a block diagram of the mobile station 105 is shown according to one embodiment. In one of its simpler forms, the mobile station 105 comprises a receiver 205 for tuning to the broadcast channel for receiving the BCMCS content transmitted from the base transceiver sites 110. A transmitter 210 may transmit data to the base transceiver site 110 with which the mobile station 105 is communicating. The mobile station 105 also comprises a controller 215 for controlling various operating functions of the mobile station 105.

The mobile station 105 is further configured with a user identification module (UIM) 220. In one embodiment, the UIM 220 may be a removable memory module coupled to the controller 215 of the mobile station 105. It will be appreciated, however, that the UIM 220 could alternatively be implemented as a fixed part of the mobile station 105. The UIM 220 is generally associated with a particular user of the mobile station 105, and is used to verify that the particular user of the mobile station 105 is entitled to the privileges afforded to that particular user, such as access to the wireless communication system 100, particular services/features provided by the system 100, and/or access to particular content subscribed to through the BCMCS service.

The mobile station 105 may also include a display screen 230 to permit viewing of the content provided by the content provider 160. As mentioned, the mobile station 105 illustrated in FIG. 2 is provided in one of its simpler forms. Accordingly, the mobile station 105 may include additional components for providing a variety of other functions without departing from the spirit and scope of the present invention. Additionally, it will be appreciated that the functionality of some of the components of the mobile station 105 may be integrated into a single component as opposed to being provided as a single entity component.

The content broadcast within the wireless communication system 100 is encrypted and decrypted through several levels of encryption and decryption to provide at least some level of assurance that unauthorized users will not be able to decrypt the content to which they are not entitled (i.e., content that is not subscribed to by the user of the mobile station 105). To enable the encryption and decryption of the content, the BCMCS service employs the use of encryption keys. A key is a value that works with a cryptographic algorithm to produce specific ciphertext. Examples of schemes for encryption and decryption of data contents in a multicast-broadcast-multimedia system are described in U.S. patent application Ser. No. 09/933,972, entitled "Method and Apparatus for Security in a Data Processing System," filed Aug. 20, 2001, which is incorporated herein by reference in its entirety.

To decrypt the broadcast content at a particular time, the mobile station 105 needs to know the current decryption key. To avoid theft-of-service of the content provided by the BCMCS, the decryption key is typically changed frequently, such as every minute, for example. These decryption keys are referred to as short-term keys (SK), which are used to decrypt the broadcast content for a relatively short period of time.

To obtain access to the BCMCS controller 150, the user of the mobile station 105 registers with and then subscribes to the BCMCS. Once the subscription is enabled, the various encryption keys are updated periodically with the mobile station 105. In the registration process, the BCMCS controller 150 and the UIM 220 of the mobile station 105 agree on a registration key (RK) that serves as a security association between the user and the BCMCS. The BCMCS controller 150 may then send the UIM 220 further secret information encrypted with the registration key RK. The registration key RK is kept secret in the UIM 220, and is unique to a given UIM 220 of the mobile station 105 (i.e., each user is assigned a different registration key RK).

In the subscription process, the BCMCS controller 150 sends the UIM 220 of the mobile station 105 the value of a common Broadcast Access Key (BAK), which is a medium-term, shared key that is used for deriving multiple short-term keys SK and is distributed to the UIM 220 of the subscribed users on a per-user basis. The BCMCS controller 150 sends to the UIM 220 the value of the broadcast access key BAK encrypted using the registration key RK unique to the UIM 220. The UIM 220 of the mobile station 105 is able to recover the value of the original broadcast access key BAK from the encrypted version using the registration key RK stored therein. The broadcast access key BAK serves as a security association between the BCMCS controller 150 and the group of subscribed users to the broadcast-multicast service. A broadcast access key identifier BAKID is the broadcast access key BAK encrypted with the registration key RK along with an identifier to indicate the particular content transmitted to the mobile station 105.

For each subscriber, the BCMCS controller 150 encrypts the broadcast access key BAK using a temporary key TK, which is derived from the user-specific registration key RK stored in the UIM 220 and a random number TKRAND to obtain a user specific encrypted broadcast access key identifier BAKID. The BCMCS controller 150 sends the corresponding broadcast access key identifier BAKID to the mobile station 105 of the subscribed user. For example, the broadcast access key BAK may be transmitted as an IP packet encrypted using the registration key RK corresponding to each UIM 220. In the exemplary embodiment, the broadcast access key identifier BAKID is an IPSec packet, and the broadcast access key BAK is an IPSec packet having the broadcast access key BAK that is encrypted using the registration key RK as the key. Since the registration key RK is a "per user" key, the BCMCS controller 150 sends the broadcast access key BAK to each subscriber individually. Thus, the broadcast access key BAK is not sent over the broadcast channel of the wireless communication system 100. The mobile station 105 passes the broadcast access key identifier BAKID to the UIM 220. The UIM 220 computes the broadcast access key BAK using the value of the registration key RK stored in UIM 220 and the value of the broadcast access key identifier BAKID. The value of the broadcast access key BAK is then stored in the UIM 220. In one embodiment, the broadcast access key identifier BAKID includes a Security Parameter Index (SPI) value instructing the controller 215 of the mobile station 105 to pass the broadcast access key identifier BAKID to the UIM 220, and instructing the UIM 220 to use the registration key RK for decrypting the broadcast access key BAK. The period for updating the broadcast access key BAK is desired to be sufficient to allow the BCMCS controller 150 to send the broadcast access key BAK to each subscriber individually, without incurring significant overhead.

The BCMCS controller 150 then broadcasts the short-term key SK such that the mobile station 105 is able to decrypt particular content associated with the short-term key. The short-term key SK is a function of the broadcast access key BAK and a periodically changing number SKRAND. The periodically changing number SKRAND may be a random number generated with a hashing function similar to a cryptographic hash function. The periodically changing number SKRAND may also be a sequence number, a time stamp, or other changing value as long as the implementation is such that a user cannot pre-compute the short-term key SK. The UIM 220 extracts the short-term key SK from the broadcast access key BAK and the SKRAND, by using the function of the broadcast access key BAK and SKRAND, and passes the short-term key SK to the controller 215 of the mobile station 105. The BCMCS controller 150 encrypts the broadcast content using the current short-term key SK. In one embodiment, an encryption algorithm, such as the Advanced Encryption Standard (AES) Cipher Algorithm, for example is employed. The encrypted content is then transported by an IPsec packet according to the Encapsulating Security Payload (ESP) transport mode. The IPsec packet also contains an SPI value that instructs the mobile station 105 to use the current short-term key SK to decrypt received broadcast content.

Various other embodiments of using public keys or shared-secret keys for encryption and decryption may also be implemented within the scope of the present invention. For example, in an alternate embodiment, secure delivery or provisioning of the broadcast access key BAK to the UIM 220 may be provided by using public key mechanisms, such as RSA or ElGamal, for example, which are known to persons skilled in the art.

Figure 3:
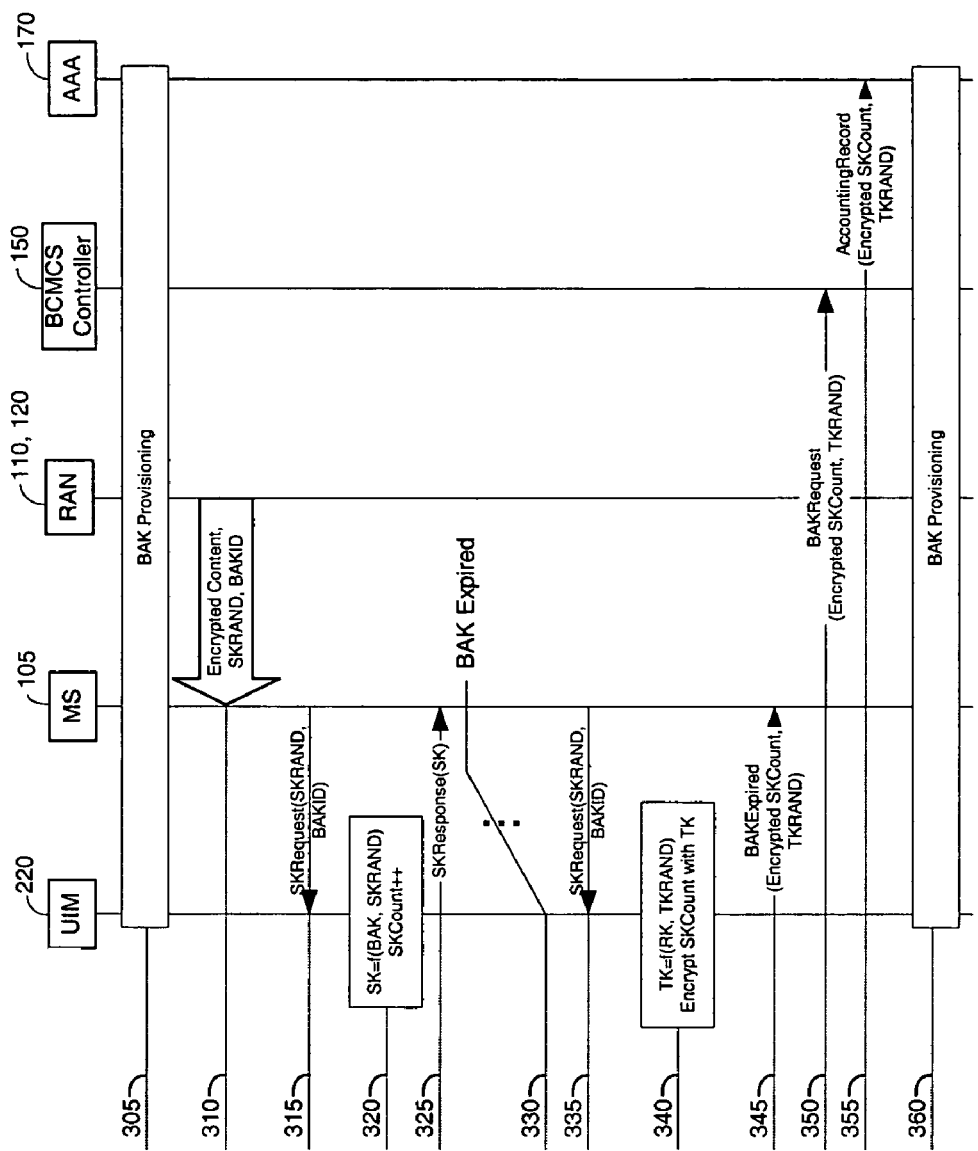
FIG. 3 is a signaling flow diagram illustrating the signaling between the components of the wireless communication system of FIG. 1 to implement time-based charging for viewing BCMCS content.

FIG. 3 is a signaling flow diagram for implementing time-based charging for broadcast-multicast services according to one embodiment of the present invention. The broadcast access key BAK for the particular channel of interest is provisioned into the memory in the user identification module (UIM) 220 of the mobile station 105. The broadcast access key provisioning message is transmitted from the AAA server 170 to the UIM 220 of the mobile station 105 at 305 as illustrated in FIG. 3. The BCMCS controller 150 encrypts the broadcast access key BAK with the temporary key TK, which is derived from the registration key RK and the random number TKRAND. In one embodiment, the registration key RK has been provisioned into the UIM 220 of the mobile station 105 before the BAK provisioning commences at 305.

At 310, the radio access network (RAN), which is collectively formed by the base station controller 120 and the base transceiver sites 110, broadcasts encrypted content through the broadcast channel to the mobile station 105. Along with the encrypted content, the radio access network also broadcasts the periodically changing number SKRAND and the broadcast access key identifier BAKID to identify the broadcast access key BAK. The periodically changing number SKRAND and the broadcast access key BAK are used by the mobile station 105 to compute the short-term key SK.

The mobile station 105 receives the encrypted content, SKRAND, and BAKID from the base transceiver site 110 of the radio access network. The controller 215 of the mobile station 105 sends the received SKRAND and BAKID to the UIM 220 with a request (SKRequest) for the short-term key SK at 315. The request SKRequest sent to the UIM 220 also includes an identifier for the broadcast channel. At 320, the UIM 220 computes the short-term key SK from SKRAND and the BAK identified by the BAK identifier BAKID.

The UIM 220 maintains a short-term key count (SKCount) of the number of short-term keys SKs derived for each broadcast channel. UIM 220 increments SKCount each time it computes and delivers a new short-term key. The amount of time that a user has been viewing a particular content channel may be derived by multiplying SKcount by the period with which the short-term key changes (i.e., SKPeriod). In one embodiment, SKPeriod may be set by a system operator based on the operator's potential risk for content theft. For example, SKPeriod may range from several seconds to several minutes.

At 325, the UIM 220 sends the short-term key SK to the controller 215 of the mobile station 105. Upon receipt of the short-term key SK from the UIM 220, the controller 215 of the mobile station 105 can now use the short-term key SK to decrypt content and render the received content for viewing on the display screen 230 of the mobile station 105.

The processes of 310 through 325 are repeated every time the mobile station 105 receives a new periodically changing number SKRAND from the base transceiver site 110 of the radio access network. The periodically changing number SKRAND may be changed frequently to ensure that authorized users view broadcast content.

At 330, the broadcast access key BAK stored in the UIM 220 of the mobile station 105 may be at its expiration or may be close to expiration. The controller 215 of the mobile station 105 sends SKRAND and BAKID to the UIM 220 with a request SKRequest for the short-term key SK at 335.

At 340, when the UIM 220 determines the broadcast access key BAK has expired, the UIM 220 computes the temporary key TK using the registration key RK and the random number TKRAND. The temporary key TK is a single use user-specific key that may be used to encrypt and decrypt the broadcast access key BAK values. TKRAND is a random number that may be generated with a hashing function similar to a cryptographic hash function. Thus, TK is a temporary key which uses the registration key RK as a secret key and is derived from the registration key RK and the random number TKRAND.

At 345, the UIM 220 encrypts the short-term key count SKCount using the temporary key TK, and sends the encrypted SKCount and TKRAND to the controller 215 of the mobile station 105 along with an indication that a fresh broadcast access key BAK is needed. Since SKCount is encrypted with the temporary key TK, which is unknown to the controller 215 of the mobile station 105, the controller 215 cannot intelligently change the encrypted SKCount to a lower value. This substantially reduces the likelihood of content theft and protects the user from unauthorized access to the user's content viewing count.

In another embodiment, the short-term key SK may be transmitted in the clear and the UIM 220 may generate a signature using SKCount and the temporary key TK. In this embodiment, the signature would be transmitted to the AAA server 170.

At 350, the controller 215 of the mobile station 105 sends a request for a "fresh" (i.e., new) broadcast access key BAK to the BCMCS controller 150. Along with the broadcast access key BAK request, the mobile station 105 includes the encrypted SKCount and TKRAND received from the UIM 220.

At 355, the BCMCS controller 150 passes the encrypted SKCount and TKRAND to the AAA server 170. The AAA server 170 computes the temporary key TK from the registration key RK and TKRAND, and decrypts SKCount. The AAA server 170 updates the accounting record of the user with the SKCount. At 360, a new broadcast access key BAK is provisioned into UIM 220 of the mobile station 105. As mentioned, the amount of time that a user has been viewing a particular content may be derived by multiplying SKCount by the period with which the short-term key changes (i.e., SKPeriod). Accordingly, the user of the mobile station 105 may be charged for the amount of time that the user is actually viewing the content (since the short-term key SKs is needed to view the content) as opposed to being charged from the time that the BAK is received at the mobile station 105.

To avoid interruption to the broadcast service being viewed by the user, the mobile station 105 may fetch a new broadcast access key BAK from the AAA server 170 before the current BAK expires. In this case, the mobile station 105 would continue to use the old BAK for a while after a new BAK is provisioned into the UIM 220.

It is important to ensure SKCount is correctly maintained. In one embodiment, upon sending SKCount to the mobile station 105, UIM 220 disables the old counter and starts a new counter for the broadcast channel under consideration. The old counter may be discarded when a new BAK is provisioned in the UIM 220. If a new BAK is not provisioned, the UIM 220 returns the sum of the old and new counters as SKCount the next time the mobile station 110 requests SKCount. Authentication, Authorization, and Accounting (AAA) may be performed using the sum of the old and new counters to provide the content view time.

In another embodiment, UIM 220 continues to increment SKCount after sending the current value of the counter to mobile station 105. When the BCMCS controller 150 sends a new BAK, it also sends back the count received from the UIM 220 in the BAK request in encrypted form. UIM 220 decrypts the count received from BCMCS controller 150 and subtracts the received count from the SKCounter. This particular embodiment permits prepaid billing to be applied to the time-based charging. BCMCS controller 170 maintains the counts paid for and sends them to UIM 220. UIM 220 then computes the difference and permits the user to pay for more counts if required.

In another embodiment, UIM 220 resets the SKCounter to zero when a new BAK is provisioned. In this particular embodiment, the user will not be charged for viewing the broadcast content during the time between sending the SKCount and receiving a new BAK.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. Alternatively, the storage medium may be integral to the processor. The processor and the storage medium may reside in a single ASIC or as separate components in a mobile station, for example.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method, comprising:
   receiving a periodically changing number;
   receiving a first key with an identifier to indicate a service channel having content associated therewith;
   generating at a terminal at least one second key as a function of at least said periodically changing number and said first key, the at least one second key configured to enable access to the content; and
   counting at the terminal the generated quantity of second keys to produce a count value for accounting of the content displayed at the terminal.

2. The method of claim 1, further comprising:
   determining a period between the generation of the one second key and a subsequently generated second key.

3. The method of claim 1, further comprising:
   encrypting the count value; and
   transmitting the encrypted count value to a remote server.

4. The method of claim 3, wherein said encrypting the count value further comprises:
   encrypting the count value as a function of a registration key and a random number.

5. The method of claim 3, further comprising:
   receiving the encrypted count value at the remote server; and
   decrypting the encrypted count value.

6. The method of claim 2, further comprising:
   determining an amount of time the content was viewed at the terminal as a function of at least the count value and the determined period.

7. An apparatus, comprising:
   means for receiving a periodically changing number;
   means for receiving a first key with an identifier to indicate a service channel having content associated therewith;
   means for generating at a terminal at least one second key as a function of at least said periodically changing number and said first key, the at least one second key configured to enable access to the content; and
   means for counting at the terminal the generated quantity of second keys to produce a count value for accounting of the content displayed at the terminal.

8. The apparatus of claim 7, further comprising:
   means for determining a period between the generation of the one second key and a subsequently generated second key.

9. The apparatus of claim 7, further comprising:
   means for encrypting the count value; and
   means for transmitting the encrypted count value to a remote server.

10. The apparatus of claim 9, wherein said means for encrypting the count value further comprises:
    means for encrypting the count value as a function of a registration key and a random number.

11. The apparatus of claim 9, further comprising:
    means for receiving the encrypted count value at the remote server; and
    means for decrypting the encrypted count value.

12. The apparatus of claim 8, further comprising:
    means for determining an amount of time the content was displayed at the terminal as a function of at least the count value and the determined period.

13. A terminal in a communication system, comprising:
a receiver for receiving a periodically changing number and a first key with an identifier to indicate a service channel having content associated therewith;
a controller for generating at the terminal at least one second key as a function of at least said periodically changing number and said first key, the at least one second key configured to enable access to the content; and
wherein said controller counts at the terminal the generated quantity of second keys to produce a count value for accounting of the content displayed at the terminal.

14. The terminal of claim 13, wherein said controller further determines a period between the generation of the one second key and a subsequently generated second key.

15. The terminal of claim 13, wherein said controller encrypts the count value; and further comprising:
a transmitter for transmitting the encrypted count value to a remote server.

16. The terminal of claim 15, wherein said controller encrypts the count value as a function of a registration key and a random number.

17. The terminal of claim 15, wherein said remote station receives the encrypted count value transmitted from the terminal and decrypts the encrypted count value.

18. The terminal of claim 14, wherein said remote station determines an amount of time the content was displayed at the terminal as a function of at least the count value and the determined period.

19. The method of claim 6, further comprising:
charging a user of the terminal according to the amount of time the content was viewed at the terminal.

* * * * *